United States Patent Office 3,600,414
Patented Aug. 17, 1971

3,600,414
SILOXANES HAVING CASTOR OIL DERIVATIVES JOINED THERETO THROUGH URETHANE RADICALS
Robert S. Craig, Waukegan, Ill., assignor to General Electric Company
No Drawing. Filed Dec. 1, 1967, Ser. No. 687,093
Int. Cl. C09f 7/00
U.S. Cl. 260—404.5                  8 Claims

ABSTRACT OF THE DISCLOSURE

A radical derived from castor oil is joined to a siloxane through a urethane radical. A compound within the scope of the present invention is made by reacting a triisocyanate-terminated triurethane derivative of glyceryltriricinoleate of the formula:

$$\text{OCN-}\underset{H_3C}{\text{C}_6H_3}\text{-N(H)-C(O)-OCHCH}_2\text{CH=CH(CH}_2)_7\text{C(O)-OCH}_2$$
$$\text{(CH}_2)_5\text{CH}_3$$

(three such arms, terminating in $OCH_2$, $OCH$, $OCH_2$ respectively on a glyceryl backbone)

with allyl alcohol to produce a castor oil derivative of the formula:

$$CH_2=CHCH_2O-C(O)-N(H)-\underset{H_3C}{\text{C}_6H_3}\text{-N(H)-C(O)-OCHCH}_2\text{CH=CH(CH}_2)_7\text{C(O)-OCH}_2$$
$$(CH_2)_5CH_3$$

(three analogous arms)

This terminal olefin-containing derivative is then reacted with a polysiloxane of the formula:

$$\left[\begin{array}{c}CH_3\\HSiO\\CH_3\end{array}\right]\left[\begin{array}{c}CH_3\\SiO\\CH_3\end{array}\right]_{150}\left[\begin{array}{c}CH_3\\SiH\\CH_3\end{array}\right]$$

to produce a copolymer having alternate siloxane and castor oil derivative units. Products within the scope of the present invention are useful in auto polishes.

---

This invention relates to siloxanes having castor oil derivatives joined thereto through urethane radicals.

The compositions of the present invention are useful in many applications where it is desired to combine the desirable properties of castor oil with the desirable properties of siloxanes. For example, the compositions are useful in auto polish and furniture polish, in that they give the sheen and luster characteristics of castor oil, the ease of rub-out characteristic of the polysiloxane, and a hard, tack-free surface which is characteristic of the compositions of the present invention.

Castor oil when used alone, while it does provide a sheen and luster, leaves the surface with the sticky feel of chewing gum. Other polishes on the market today also provide a sheen and luster with ease of rub-out as do the compositions of the present invention. This is accomplished, however, by using a low viscosity polish and the shine does not last because the low viscosity polish wicks into the base or rubs off.

The compositions of the present invention are siloxanes having attached hereto radicals derived from a urethane-modified castor oil. These compositions are defined by the average unit formula:

(1)
$$\left[\begin{array}{c}(CH_2)_5CH_3\\ -(CH_2)_dZ'OCHCH_2E(CH_2)_7C(O)-OCH_2\\ (CH_2)_5CH_3\\ ZOCHCH_2E(CH_2)_7C(O)-OCH\\ (CH_2)_5CH_3\\ ZOCHCH_2E(CH_2)_7C(O)-OCH_2\end{array}\right]_d [-(CH_2)_dOH]_b(R)_cSiO_{\frac{4-a-b-c}{2}}$$

where E is selected from the class consisting of

—CH$_2$CH$_2$— and —CH=CH— radicals, R is selected from the class consisting of lower alkyl radicals, mono cycloalkyl radicals hydrocarbyl aryl, hydrocarbyl aryl lower alkyl radicals, halogenated derivatives of the aforementioned radicals and lower cyanoalkyl radicals; Z is selected from the class consisting of H—, H(OR'')$_e$—, CH$_2$=CHCH$_2$N(H)—C(O)—, CH$_2$=CHCH$_2$O—C(O)—N(H)—R'—N(H)—C(O)—, ≡Si(CH$_2$)$_2$N(H)—C(O)—, and ≡Si(CH$_2$)$_3$N(H)—C(OR'')$_e$— radicals where ≡Si is a silicon atom of an adjacent siloxane block falling within the scope of average unit Formula 1 and the indicated valence of the Z radical constitutes a bond to a carbinol oxygen atom of the castor oil derivative radical; Z' is selected from the class consisting of a

—N(H)—C(O)— radical bonded to the carbinol oxygen atom of the castor oil derivative radical to form a urethane, a —N(H)—C(OR'')$_e$— radical bonded to a carbinol oxygen atom of the castor oil derivative to form an ether therewith, a

—OC(O)—NR'N(H)—C(O)— radical bonded to the carbinol oxygen atom of the castor oil derivative radical to form a urethane and a

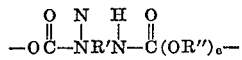

radical bonded to a carboinol oxygen atom of the castor oil derivative to form an ether therewith, where R' is a divalent organic radical selected from the class consisting of mono alkylene, mono cycloalkylene and mono and binuclear arylene radicals; R" is an alkylene radical having 2 to 4 carbon atoms, $a$ has a value of 0.001 to 0.5 and preferably has a value of 0.01 to 0.02, $b$ has a value of 0 to 1, and preferably has a value of 0, $c$ has a value of 1.002 to 2.5, and preferably has a value of 2, the sum of $a$ plus $b$ plus $c$ is equal to 2.003 to 3, $d$ is an integer having a value of 2 to 3, and $e$ has a value of 1 to 10,000.

A compound within the scope of Formula 1 is characterized by the presence of one or more urethane radicals attached both to a silicon atom of a siloxane through an alkylene radical and to a ricinoleate radical directly, or through an organic radical bonded to a second urethane radical. The alkylene radical is further characterized by the fact that the urethane group is attached to the silicon atom by an alkylene radical containing two to four carbon atoms. For the purposes of this application, the urethane radical attached to the alkylene radical is referred to as a "urethane alkyl" radical. Thus, the urethane alkyl radical may be a beta-urethane ethyl radical, a beta-urethane propyl radical, or a gamma-urethane propyl radical. In addition, a polyether radical can be interposed between the urethane radical and the ricinoleate derivative radical. Thus, among the radicals represented by Z' of Formula 1 can be mentioned a

radical bonded to the carbinol oxygen atom of the castor oil derivative radical to form a urethane, a

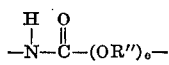

radical bonded to a carbinol oxygen atom of the castor oil derivative to form an ether therewith.

Among the alkylene radicals represented by R' may be mentioned ethylene, propylene, butylene, octylene, etc. radicals; among the cycloalkylene radicals represented by R' may be mentioned cyclohexylene, cycloheptylene, etc. radicals; among the arylene radicals represented by R' may be mentioned phenylene, tolylene, naphthylene, etc., R" is an ethylene or propylene radical.

Among the radicals represented by R of Formula 1 to be more specific, can be mentioned, for example, lower alkyl radicals having 1 to 8 carbon atoms, e.g., methyl, ethyl, propyl, butyl, octyl, etc. radicals; mono cycloalkyl radicals, e.g., cyclohexyl, cycloheptyl, etc. radicals; mononuclear and binuclear aryl radicals, e.g., phenyl, tolyl, naphthyl, xylyl, etc. radicals; aryl lower alkyl radicals, e.g., benzyl, phenylethyl, etc. radicals; halogenated derivatives of the aforementioned radicals, e.g., chloromethyl, chlorophenyl, dibromophenyl, etc. radicals; and lower cyanoalkyl radicals, e.g., cyanoethyl, cyanopropyl, etc. radicals. In the preferred embodiment of my invention, the R radical is an alkyl or aryl radical, with the methyl or the phenyl radical being the specific preference. Compounds within the scope of Formula 1 can be prepared by the following series of reaction.

The first of the series is the reaction between allyl alcohol and a castor oil derivative having terminal isocyanate groups and having the formula:

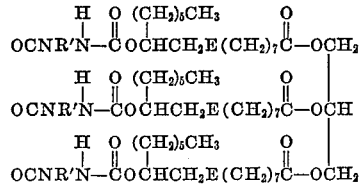

The hydroxyl groups of the allyl alcohol react with the terminal isocyanate groups of the castor oil derivative to form urethane-bonded terminal olefinic groups on the castor oil derivative radical. The compound produced has the formula:

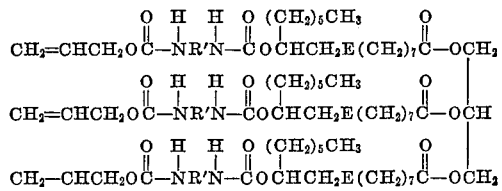

The castor oil derivative containing the terminal olefinic groups is then reacted with a siloxane of the average formula

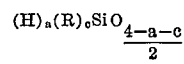

The terminal olefin groups of the castor oil derivative react with the ≡SiH groups of the siloxane through an ≡SiH-olefin addition reaction to produce a compound within the scope of Formula 1 having one or more siloxane blocks joined to one or more radicals derived from castor oil. In the above formulas, R, R', E. $a$ and $c$ are as previously defined.

Variations may be made in the above reaction to arrive at the same result. For example, the allyl alcohol instead of being reactive with the isocyanate-terminated castor oil derivative, may be added to the ≡SiH-containing siloxane by an SiH-olefin addition reaction and the hydroxy alkyl-terminated polysiloxane produced, in turn reacted with the isocyanate-terminated castor oil derivative. Other hydroxy alkyl-terminated siloxanes may also be reacted with the isocyanate-terminated castor oil derivative in lieu of the hydroxy propyl-terminated polysiloxane. For example, a hydroxyethyl containing siloxane can be used in the practice of the present invention.

Another variation in the above method is to react a diisocyanate with an equimolar quantity of allyl alcohol to produce a compound having both terminal isocyanate and terminal olefinic radicals, and having the formula:

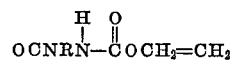

This compound can then be reacted with a hydroxy-containing castor oil or castor oil derivative and the reaction product reacted with a siloxane containing one or more ≡SiH groups. Another variation is to react allylisocyanate with castor oil to produce a modified castor oil containing terminal olefin groups, followed by an SiH-olefin addition reaction with a siloxane containing ≡SiH groups in the siloxane chain.

The compositions of the present invention owe their existence to the presence of the hydroxyl groups of the castor oil or castor oil derivative because it is through these hydroxyl groups that the coupling reactions occur. The castor oil used to produce the compounds within the scope of the present invention can be used in its unmodified form or can be modified before use. Some of the methods of modifying the castor oil include partial dehydration, partial oxidative polymerization, partial to total hydrogenation of the olefinic bonds and alkoxylation.

The preferred method of making the composition of the present invention is by the aforementioned procedure of reacting an isocyanate-terminated castor oil derivative with allyl alcohol to produce castor oil derivative containing terminal olefinic radicals. A dibutyl tin dilaurate catalyst is preferably used in this reaction although a large number of other catalysts, including other tin salts, can also be used in lieu thereof. Other catalysts which may be used include, for example, aromatic and cyclic tertiary amines, such as pyridine, diazabicyclo-2,2,2-octane and derivatives thereof.

The reaction is preferably run at 20° C. to 150° C. at atmospheric pressure. The temperature range is not critical, though compensation must be made to achieve optimum conditions depending upon catalyst activity, concentration of reactants, solvent, etc.

In the above reaction, it is preferable to use an excess of allyl alcohol over that required to react with all of the isocyanate groups present. Unreacted isocyanate groups interfere with polish formulation in that they react with any compound in the polish containing active hydrogen groups such as water, alcohols, amines, etc.

The excess of allyl alcohol used is not critical in that it can be easily stripped from the product by vacuum distillation. The time for completion of the reaction can vary from 30 minutes at 150° C. to one day or more at 50° C.

The second reaction of the series is the reaction between a castor oil derivative containing terminal olefinic groups with a siloxane containing one or more ≡SiH groups per siloxane molecule.

Any catalyst which is operative to catalyze the addition of silicon-hydrogen bonds across olefinic double bonds can be employed as a catalyst in this second of the series of reactions. Among the many useful catalysts for this addition reaction are finely divided platinum as described in Pat. 2,970,150, Bailey, chloroplatinic acid as described in U.S. Pat. 2,823,218, Speier et al., the reaction product of chloroplatinic acid with either an alcohol, an ether or an aldehyde as described in U.S. Pat. 3,220,972, Lamoreaux, trimethyl platinum iodide and hexamethyldiplatinum as described in U.S. Pat. 3,313,773, Lamoreaux and the platinum olefin complex catalysts as described in U.S. Pats. 3,159,601 and 3,159,662 of Ashby.

The SiH-olefin addition reaction may be run at room temperature or at temperatures up to 200° C., depending upon catalyst concentration. In order to conserve catalyst, it is preferable to run the reaction at about 90° C. The reaction is generally run at atmospheric pressure.

The catalyst, which was used in the SiH-olefin addition reactions in the following examples was a platinum coordinate catalyst formed by the reaction of chloroplatinic acid and octyl alcohol. The preparation of the catalyst is disclosed in Example 1 of U.S. Pat. 3,220,972 of Lamoreaux. The catalyst is dissolved in 4 times its weight of toluene to produce the final curing catalyst used in the following examples. Chemical analysis of this solution showed it to contain 3.5 atoms of chlorine per atom of platinum and 0.007 gram of platinum per gram of solution.

Solvents which may be used in the above SiH-olefin addition reaction include the usual inert hydrocarbon solvents, such as benzene, toluene, xylene, etc.

As can be seen from the following examples, the molar ratios of reactants can be widely varied. There is no requirement that stoichiometric quantities of reactants be employed. As the castor oil derivative is generally trifunctional and the siloxane employed is generally difunctional, it is preferred that stoichiometric quantities not be employed to avoid excessive cross-linking. An excess of one or the other of the reactants is preferred. In the case of the polysiloxane, up to a 10 fold excess or more, based upon equivalent weights, may be employed as unreacted siloxane aids in ease of rub-out when the composition is used in a polish.

Up to a 6 fold excess of the castor oil derivative over that required to react with all of the reactive groups of the siloxane may be employed before an appreciable sticky feel is developed in the polish employing the composition.

The following examples are illustrative of the practice of my invention and are not intended for purposes of limitation.

EXAMPLE 1

Into a 5 liter 3-necked flask was placed 1,000 grams of a tolylene diisocyanate modified, saturated castor oil. The principal ingredient of the composition has the formula:

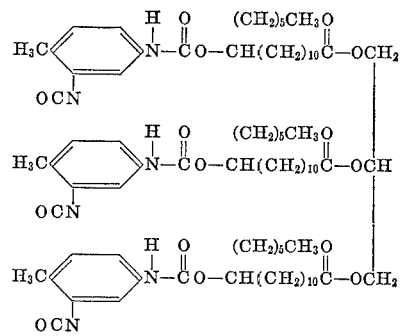

To modified castor oil was added 1 liter of dry toluene, and 0.4 gram of dibutyl tin dilaurate. To this mixture with agitation was slowly added 200 grams of allyl alcohol. The reaction mixture was held at 90° C. for one hour, at which time the I.R. spectrum of the reaction mixture indicated that the reaction had gone to completion by the disappearance of the —NCO band at 4.5 microns. The solution was filtered and the excess allyl alcohol and toluene were stripped off at 10 mm. and 100° C. A castor oil derivative having terminal olefinic groups and having the following formula was produced.

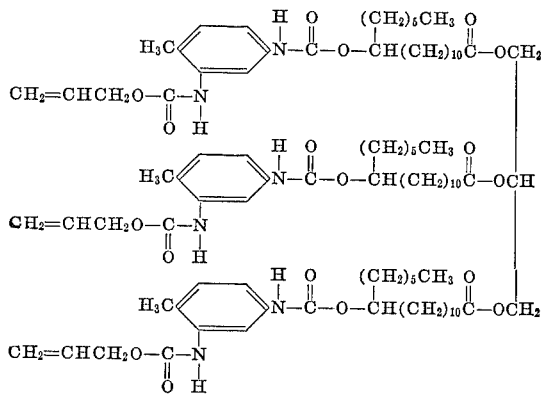

Into a 5 liter 3-necked flask was placed 480 grams of the castor oil derivative containing the terminal olefinic groups described above, 1,000 ml. of toluene and 1.0 ml. of the platinum coordinate catalyst solution, the preparation of which was described earlier. The mixture was heated to reflux and 1,000 grams of a polysiloxane having ≡SiH groups of the formula:

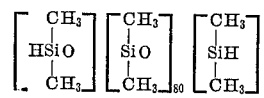

was added slowly with agitation. After the addition of the polysiloxane fluid the reaction mixture was held at reflux for two hours, then filtered. The toluene was then stripped from the solution at 10 mm. at 100° C. The I.R. spectrum of the fluid showed the appearance of the

band at 3.1 microns, the strengthening of the —COOR band at 5.7 microns, and a great reduction in intensity of the ≡SiH bands at 4.6 microns and 11 microns. The product was a clear, viscous, yellow-orange fluid. The principal ingredient of the fluid was a polymer defined by Formula 1 where E is —CH=CH, R is methyl, Z is

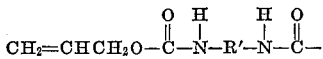

Z' is

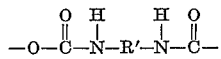

R' is phenylene, a has a value of 0.024, b has a value of 0, c has a value of 2, a plus b plus c has a value of 2.024, and d has a value of 3.

EXAMPLE 2

Into a 5 liter, 3-neck flask was placed 1,000 grams of tolylene diisocyanate modified castor oil. The principal ingredients of the composition had the formula:

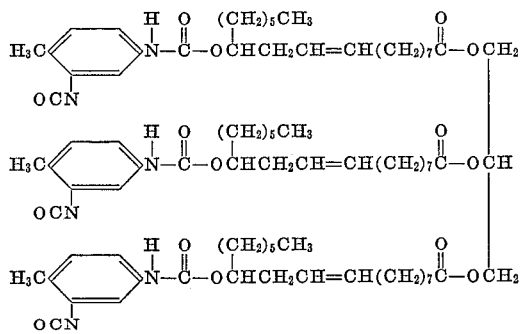

To the modified castor oil was added 1 liter of dry toluene, 0.4 gram of dibutyl tin dilaurate and the resulting mixture was agitated until homogeneous. To this mixture was added slowly with agitation, 205 grams of allyl alcohol. The reaction mixture was held at 90° C. for one hour, at which time the I.R. spectrum of the reaction mixture indicated that the reaction had gone to completion by the disappearance of the —NCO band at 4.5 microns. The reaction mixture was filtered and the excess toluene and allyl alcohol were stripped at 100° C. and 10 mm. A castor oil derivative having terminal olefinic groups was produced having the formula:

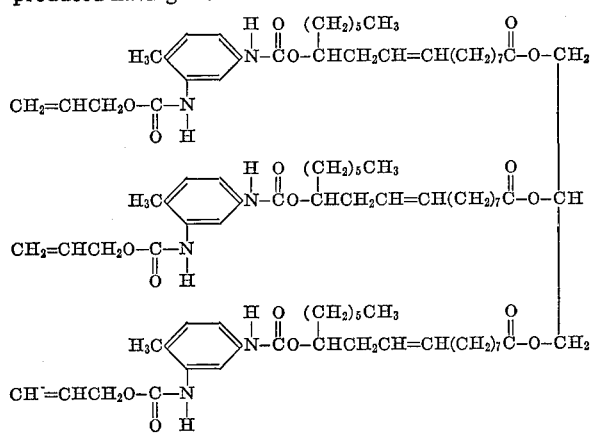

Into a 5 liter 3-neck flask was placed 127 grams of modified castor oil containing the olefinic terminal groups described above, 1 liter of toluene and 1 ml. of the platinum coordinate catalyst solution. The mixture was heated to reflux and 1,000 grams of a polysiloxane fluid was added dropwise with stirring. The polysiloxane fluid had the average formula:

After the addition of the polysiloxane fluid, the reaction mixture was held at reflux for two hours. The toluene was then stripped from the solution at 100° C. and 10 mm. The I.R. spectra of the product showed the strengthening of the

band at 3.1 microns, the strengthening of the —COOR band at 5.75 microns and a great reduction in intensity of the ≡SiH bands at 4.6 microns and 11.0 microns. The product was a clear, light yellow, viscous fluid defined by Formula 1 when E is —CH=CH—, R is methyl, Z' is

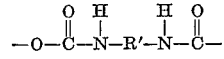

R' is phenylene, a has a value of 0.01, b has a value of 0, c has a value of 2.01, a plus b plus c has a value of 2.02, and d has a value of 3.

EXAMPLE 3

The clear, yellow, viscous fluid of Example 2 was used to make a car polish. This was accomplished by forming first a dispersion of 80 grams of the fluid in 150 grams of mineral spirits and 150 grams of a high flash naphtha having a boiling range of 240–290° F.

A second formulation was made up by first adding 0.5 gram of a solid high molecular weight carboxyvinyl polymer, containing an average of 1,000 carboxyvinyl units per molecule and one acid carboxy group per vinyl radical, to 49.5 ml. of water with rapid high shear agitation. To this was added 50 grams of an aqueous 1% triethanolamine solution, 10 grams of morpholine and 410 grams of water.

The formulation containing the viscous fluid of Example 2 was then mixed with the formulation containing the carboxyvinyl polymer with rapid high shear agitation until a uniform mixture was obtained. Then with rapid high shear agitation, 100 grams of diatomaceous earth was added. The agitation was continued until a uniform blend was obtained. The composition was tested on a standard black enamel test panel and found to have good rub-out, good gloss, and a smooth non-tacky surface.

EXAMPLE 4

Into a 500 ml. 3-neck flask was placed 69.6 grams of 2,4-tolylenediisocyanate, 40 grams of toluene (dry) and 0.3 ml. of dibutyl tin dilaurate. The resulting mixture was agitated until homogeneous. To this mixture was added slowly with agitation 23.2 grams of allyl alcohol. The reaction mixture was held at 90° C. for one hour. The reaction mixture was filtered and the excess toluene was stripped off at 100° C. and 10 mm. The product of the above reaction had the formula:

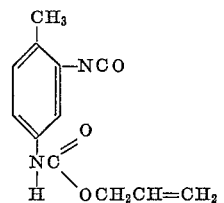

Into a one liter flask was placed 14.3 grams of the allyl alcohol-tolylenediisocyanate reaction product, 200 ml. of dry toluene, and 0.3 ml. of dibutyl tin dilaurate. To this mixture was added slowly and with agitation 200 grams (0.15 mole) of a polyether modified castor oil of the average formula:

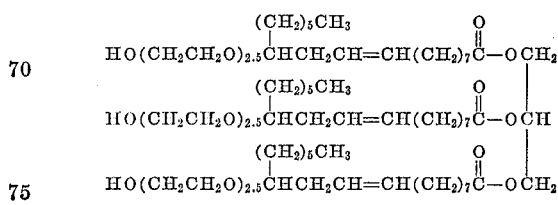

The reaction mixture was held at 90° C. for 1 hour at which time the I.R. spectra of the reaction mixture indicated that the reaction had gone to completion by disappearance of the —NCO band at 4.5 microns. The reaction product was filtered. To the flask containing the reaction product was added 0.4 ml. of the platinum coordinate catalyst and 200 grams of a polysiloxane having the average formula:

The reaction mixture was then held at reflux for two hours. The toluene was then stripped from the solution at 100° C. and 10 mm. The infrared spectra of product showed the strengthening of the

band at 3.1 microns, the strengthening of the —COOR band at 5.75 microns and a great reduction in intensity of the ≡SiH bands at 4.6 microns and 11.0 microns. The product was a clear, light yellow, viscous fluid.

The composition is defined by Formula 1 when E is —CH=CH—, R is methyl, Z is a $H(OCH_2CH_2)_{2.5}$ radical, Z' is

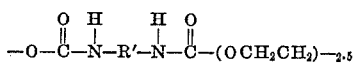

$a$ has a value of 0.083, $b$ has a value of 0, $c$ has a value of 2.08, the sum of $a$ plus $b$ plus $c$ has a value of 2.16, $d$ has a value of 3, and $e$ has a value of 2.5

What I claim as new and desire to secure by Letters Patent of the United States is:

1. A composition of matter having the average unit formula:

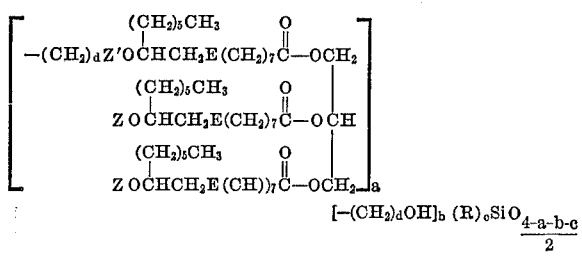

where E is selected from the class consisting of —CH$_2$CH$_2$— and —CH=CH— radicals, R is selected from the class consisting of lower alkyl radicals, monocycloalkyl radicals, hydrocarbyl aryl, hydrocarbyl aryl lower alkyl radicals, halogenated derivatives of the aforementioned radicals, and lower cyanoalkyl radicals; Z is selected from the class consisting of H—, $H(OR'')_e$—, $CH_2$=$CHCH_2N$—$C$—,

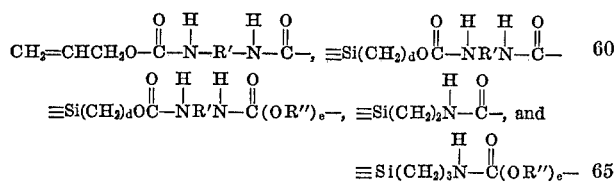

radicals, where ≡Si is a silicon atom of an adjacent siloxane block falling within the scope of the average unit formula and the indicated valence of the Z radical constitutes a bond to a carbinol oxygen atom of the castor oil derivative radical; Z' is selected from the class consisting of a

radical bonded to the carbinol oxygen atom of the castor oil derivative radical to form a urethane, a

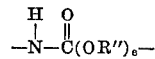

radical bonded to a carbinol oxygen atom of the castor oil derivative to form an ether therewith, a

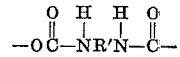

radical bonded to the carbinol oxygen atom of the castor oil derivative radical to form a urethane and a

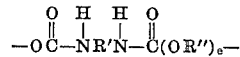

radical bonded to a carbinol oxygen atom of the castor oil derivative to form an ether therewith, where R' is a divalent organic radical selected from the class consisting of monoalkylene, monocycloalkylene, and mono and binuclear hydrocarbyl arylene radicals; R'' is an alkylene radical having 2 to 4 carbon atoms, $a$ has a value of 0.001 to 0.5, $b$ has a value of 0 to 1, $c$ has a value of 1.002 to 2.5, the sum of $a$ plus $b$ plus $c$ is equal to 2.003 to 3, $d$ is an integer having a value of 2 to 3, and $e$ has a value of 1 to 10,000.

2. The composition of claim 1 wherein E is a —CH=CH— radical, R is a methyl radical, Z is selected from the class consisting of

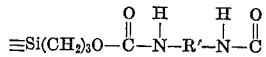

and H— radicals, Z' is a

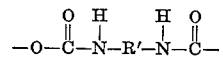

radical, $a$ has a value of 0.01 to 0.02, $b$ has a value of 0, and $c$ has a value of 2.

3. The composition of claim 1 wherein E is a —CH=CH— radical, R is selected from the class consisting of methyl and phenyl, Z is selected from the class consisting of:

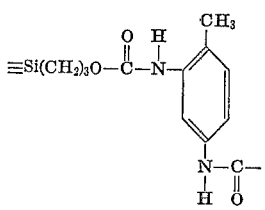

and H— radicals, and Z' is a

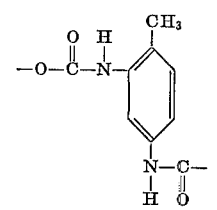

radical, $a$ has a value of 0.01 to 0.02, $b$ has a value of 0, and $c$ has a value of 2.

4. The composition of claim 1 in which E is a —CH=CH— radical.

5. The composition of claim 1 wherein R is a methyl radical.

6. The composition of claim 1 wherein $a$ has a value of 0.01 to 0.02.

7. The composition of claim 1 wherein $c$ has a value of 2.

8. The composition of claim 1 wherein Z is selected from the class consisting of:

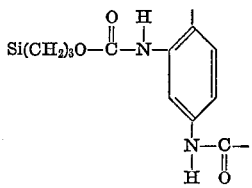

radicals, and hydrogen.

References Cited
UNITED STATES PATENTS

| | | | |
|---|---|---|---|
| 2,787,601 | 4/1957 | Detrick et al. | 260—404.5 |
| 2,823,218 | 2/1958 | Speier et al. | 260—46.5 |
| 2,884,388 | 4/1959 | Hedlund | 260—18 |
| 2,890,124 | 6/1959 | Mange | 260—404.5 |
| 2,894,922 | 7/1959 | Olson et al. | 260—46.5 |
| 3,125,554 | 3/1964 | Cooper et al. | 260—46.5 |
| 3,426,057 | 2/1969 | Kanner | 260—448.8 |
| 3,450,736 | 6/1969 | De Monterey | 260—46.5 |
| 3,159,662 | 12/1964 | Ashby | 260—46.5 |
| 3,220,972 | 11/1965 | Lamoreaux | 260—46.5 |
| 3,440,263 | 4/1969 | Brennan | 260—46.5 |

FOREIGN PATENTS

| | | | |
|---|---|---|---|
| 1,041,532 | 9/1966 | Great Britain | 260—18 |

OTHER REFERENCES

Peterson: Polyurethans etc.; (1949); CA 44, pp. 115–16 (1950).

Badische Aniline, Polishing emulsions etc.; (1958) CA 54, p. 10356 (1960).

Fasterding: Automobile-body water-repellent polishes (1966); CA 64, p. 19999 (1966).

LEWIS GOTTS, Primary Examiner

G. HOLLRAH, Assistant Examiner

U.S. Cl. X.R.

106—9, 11, 252; 117—134; 260—448.2B, 448.2N, 448.2E